United States Patent [19]
Surles et al.

[11] Patent Number: 5,551,513
[45] Date of Patent: Sep. 3, 1996

[54] PREPACKED SCREEN

[75] Inventors: Billy W. Surles, Houston; Howard L. McKinzie, Sugar Land, both of Tex.

[73] Assignee: Texaco Inc., White Plains, N.Y.

[21] Appl. No.: 440,157

[22] Filed: May 12, 1995

[51] Int. Cl.[6] ................................................ E21B 43/04
[52] U.S. Cl. ........................ 166/278; 166/51; 166/205; 166/228; 166/236
[58] Field of Search ........................... 166/51, 205, 227, 166/228, 236, 278

[56] References Cited

U.S. PATENT DOCUMENTS

| | | | |
|---|---|---|---|
| 4,800,960 | 1/1989 | Friedman | 166/276 |
| 4,821,800 | 4/1989 | Scott et al. | 166/228 |
| 4,842,072 | 6/1989 | Friedman et al. | 166/295 |
| 4,856,590 | 8/1989 | Caillier | 166/278 |
| 5,005,648 | 4/1991 | Friedman | 166/295 |
| 5,232,048 | 8/1993 | Whitebay et al. | 166/228 |
| 5,339,895 | 8/1994 | Arterbury et al. | 166/227 |

*Primary Examiner*—Roger J. Schoeppel
*Attorney, Agent, or Firm*—James L. Bailey; Kenneth R. Priem; Cynthia L. Hunter

[57] ABSTRACT

Disclosed is an improvement in a prepacked well screen assembly which includes coating the granular material in the filter medium with a resin system including an oligomer of furfuryl alcohol, a catalyst including an oil soluble, slightly water soluble organic acid, and an ester of a weak organic acid to consume water produced by the polymerization of the resin.

18 Claims, 2 Drawing Sheets

PREPACKED SCREEN

This invention relates to the use of improved prepacked well screens. In particular the invention relates to prepacked screens in which the gravel pack is coated with an improved resin system which solves major problems associated with high temperatures and the use of acid in oil wells and is less expensive than any prepacked systems currently available.

BACKGROUND OF THE INVENTION

Prepacked well screens are widely used in the oil industry for sand control. In the course of completing an oil well, it is common to first run a string of casing into the wellbore and then run the production tubing inside the casing. At the site of the producing formation, the casing is perforated across one or more production zones to allow hydrocarbons to enter the wellbore. After the well is completed and placed in production, formation sand from unconsolidated formations may be swept into the flow path along with formation fluid. This sand is usually fine and can erode production components in the flow path. As one method for controlling sand production one or more sand screens or slotted liners are installed in the flow path inside the perforated casing, along with a gravel pack. A packer may be set above and/or below the sand screen to seal off the annulus in the producing zone from non-producing formations. Another common method is to place a screen and gravel pack in a producing interval without the cemented, perforated casing. This is often called an open hole gravel pack.

In general practice, the annulus around the screen in unconsolidated formations is packed with a relatively coarse sand or gravel which acts as a filter to reduce the amount of fine formation sand reaching the screen. To spot the gravel around the screen, a pump, a work string, and service seal unit are often used. During completion, this equipment is employed to pump gravel through the work string where the gravel is squeezed into the perforations in the producing formation and placed between the screen or slotted liner and well casing in a cased well, or into the annular space between the formation and the screen or slotted liner in an open hole completion. The gravel is pumped down the work string in a slurry of water or gel. Some spaces may remain that are not filled with gravel, and they can eventually fill up with accumulated formation sand, which is prevented from entering the wellbore only by the screen or slotted liner. Additionally, fine formation sand finding its way through the gravel packs in the production flowpath can cause screen erosion and failure, unless stopped by the screen. Thus, screens and slotted liners are used to help prevent formation sand from finding its way into production.

During the initial production period following the gravel packing operation, fine sand may be carried into or through the gravel pack before the gravel pack bridge stabilizes and yields clean production. Those fines tend to migrate through the gravel pack and screen or slotted liner. In some instances, this can cause severe erosion of the screen or slotted liner and ultimate failure of the screen or slotted liner to reduce sand invasion. In other situations, the sand fines may include plugging materials which are carbonaceous, siliceous or organic solids which can completely plug the screen or slotted liner flow passages and terminate production shortly after completion. In deep wells, when the screen or slotted liner becomes plugged and the internal pressure in the production tubing is reduced, the formation pressure can collapse the screen or slotted liner. In addition, when a substantial amount of sand has been lost from the surrounding formation, the formation may collapse with resultant damage to the well casing, liner, and/or screen.

Prepacked sand screens can be used in conjunction with an external gravel pack, as additional protection against the problems just described, or they can be used instead of an external gravel pack, as an alternative remedy. Prepacked sand screens essentially consist of a combination of wire screen and perforated casing with the annular space between filled with consolidated gravel, the theory being what one does not catch, the other will. The wire wrap is often on the outside as shown in FIG. 1. The prepacked screen can also be reversed, with the wire wrap on the inside and perforated casing or sleeve on the outside, as shown in FIG. 2.

More specifically, prepacked sand screens employ a perforated mandrel which is surrounded by longitudinally extending spacer bars, rods, or ribs over which a continuous wire is wrapped in a carefully spaced spiral configuration to provide a predetermined axial gap between the wire turns. The predetermined aperture between turns permits formation fluids to flow through the screen, while the closely spaced wire turns help exclude fine particulate material such as formation sand or fines.

The part of the prepacked screen of particular interest here comprises a uniform consolidated annulus of resin-coated sand or gravel filling a space between either a pair of concentric screen members, or a screen and a perforated liner.

Prepacked screens are especially useful in problem wells where it is difficult or impossible to complete the well in the producing zone by conventional techniques of running casing, cementing, down-hole perforating, running the screen jacket assembly, and then gravel packing with a cross-over tool.

The resin-coated gravel or sand used in these prepack screen assemblies is often of the type described in an article entitled, "Performance Review of Phenolic-Resin Gravel Packing" by Lowell W. Saunders and Howard L. McKinzie which appeared in the Feb. 1981 issue of "JOURNAL OF PETROLEUM TECHNOLOGY" at pages 221–228. Such gravel has been supplied as part of a precured packing between two concentric well screens, as well as used as a direct replacement for ordinary gravel packs which are placed behind slotted liners or screens. The gravel in the prepacked screen is cured after installation by temperature and/or catalyst. The cured resin-coated gravel is degradable by some acids and in strongly basic fluids having a high pH.

There are major problems associated with prepacked screens. In some situations where damage to the well has occurred, one option for cleaning up the well is the use of strong acids; however if a prepacked screen has been installed it precludes the use of harsh acids, which are needed to remove the damage, because the acid would destroy the coatings currently used on the gravel in the prepacked screen. The coating will depolymerize, and possibly break into chunks of material which will cause further wellbore damage. Therefore, when unexpected damage is incurred in the well, the presence of a prepacked screen makes it impossible to use acid to clean up the well.

When used, such assemblies are not easily removed in the event of a failure of the internal annular gravel pack, since the prepacked screens are typically made of stainless steel which is difficult to cut through. Furthermore, they often tear apart and jam as the wire and rod of which they are made comes apart.

Other operating conditions and chemicals commonly used in oil field operations will also destroy the currently used resin on the gravel. Another example is the use of high temperature steam for enhanced recovery. If this procedure is anticipated for the well, the use of a prepacked well screen is currently precluded.

U.S. Pat. Nos. 5,005,648, 4,842,072 and 4,800,960, incorporated by reference herein in their entirety, describe a resin system comprising a furan resin, a hydrolyzable diluent, such as butyl acetate, and an acid. This resin system can withstand high temperatures and acids. These references do not address any application to well screens.

U.S. Pat. No. 4,487,259 discloses a prepacked well screen and casing assembly adapted to be lowered into a well. The invention relates to the structure rather than composition and is intended to permit the well to be completed without the use of a down-hole gravel packing operation.

In U.S. Pat. No. 4,856,590 there is disclosed a process for washing through filter media in a production zone with a pre-packed screen and coil tubing. The object is to provide a process whereby a wash down of the bottom-hole assembly may be undertaken at a great savings and in a reduced amount of time.

U.S. Pat. No. 5,377,750 discloses a sand screen completion method. U.S. Pat. 5,232,048 discloses a well screen with an increased outer surface area. In U.S. Pat. No. 5,339,895 there is disclosed a prepacked well screen assembly for separating particulate material from formation fluid. None of these patents address the problem of finding an improved resin coating for the gravel in the prepacked screen which would be inert and withstand high temperatures.

In an SPE publication, SAND CONTROL, Vol. 1, Henry L. Doherty Series, Ch. 11, 1992, there is an article titled "PLASTIC CONSOLIDATION PRINCIPLES", by W. L. Penberthy, Jr., and C. M. Chaughnessy, in which it is stated that the upper temperature limit of resins used for sand control is about 300° F. In the same publication, it is stated that furans or phenolic furans are very reactive . . . and no method is available to control them internally, such as, for example, in a deep well. This would appear to summarize the prevalent view of the art in this field. The consensus would seem to be that resin-coated sand or gravel which could withstand high temperatures and strong acids would make it much easier and less expensive to employ enhanced recovery with high temperature steam or to use strong acids for cleanup; and, further, that furan resins might have much potential for this kind of application, but previous formulations are unmanageable above approximately 300° F.

There appears to be a need in the art for a prepacked well screen which could stand up to any harsh conditions encountered in oilfield operations.

There is a need in the art for a resin system for coating gravel packs in prepacked well screens which would make the screens inert to strong acids used for cleanup and to high temperature steam used in secondary recovery.

SUMMARY OF THE INVENTION

In accordance with the foregoing the present invention is directed to an improved prepacked screen assembly of the type generally available in the art, including a uniform consolidated or unconsolidated annulus of resin-coated particulates which fill a space between either a pair of concentric screen members, or a screen and a perforated or slotted tubing, wherein the resin coating on the particulates comprises a furan resin, an ester and an internal acid catalyst.

The curing of the resin system of the improved prepacked screen can be controlled, it can be used even in deep wells at high temperatures, and it reduces or eliminates problems commonly encountered with prepacked screens now available in the art. Once set, the system is chemically inert and thermally stable in all oil field environments. Further, this system is impervious to chemical attack by solvents, strong acids, $H_2S$ $CO_2$, or other common oil field chemicals. The system is stable at temperatures well above 300° F., which is the approximate limit of existing systems, to as high as 700° F. None of the resin systems available in the art are effective in this temperature range. The desirable properties are also observed at temperatures as low as 60° F.

This means the resin would not be destroyed by the use of high temperature steam used in secondary recovery, by the use of mud acid (HCl/HF), or the use of acid in a clean up operation where a well has been damaged.

In addition to this, the resin system is approximately half the cost of phenolic resins which are currently used in the art.

DESCRIPTION OF THE PREFERRED EMBODIMENT

The design of the prepacked well screen can be selected from those known in the art. There are a number of references in the art to well screens incorporating slotted, ported or wire-wrapped screen devices which have disposed therein particulate matter, such as glass beads, gravel, sand and the like. Examples include U.S. Pat. Nos. 4,917,183; 4,856,590; 4,821,800; and 4,487,259 and 5,377,750; all incorporated by reference herein in their entirety.

Figure 1:
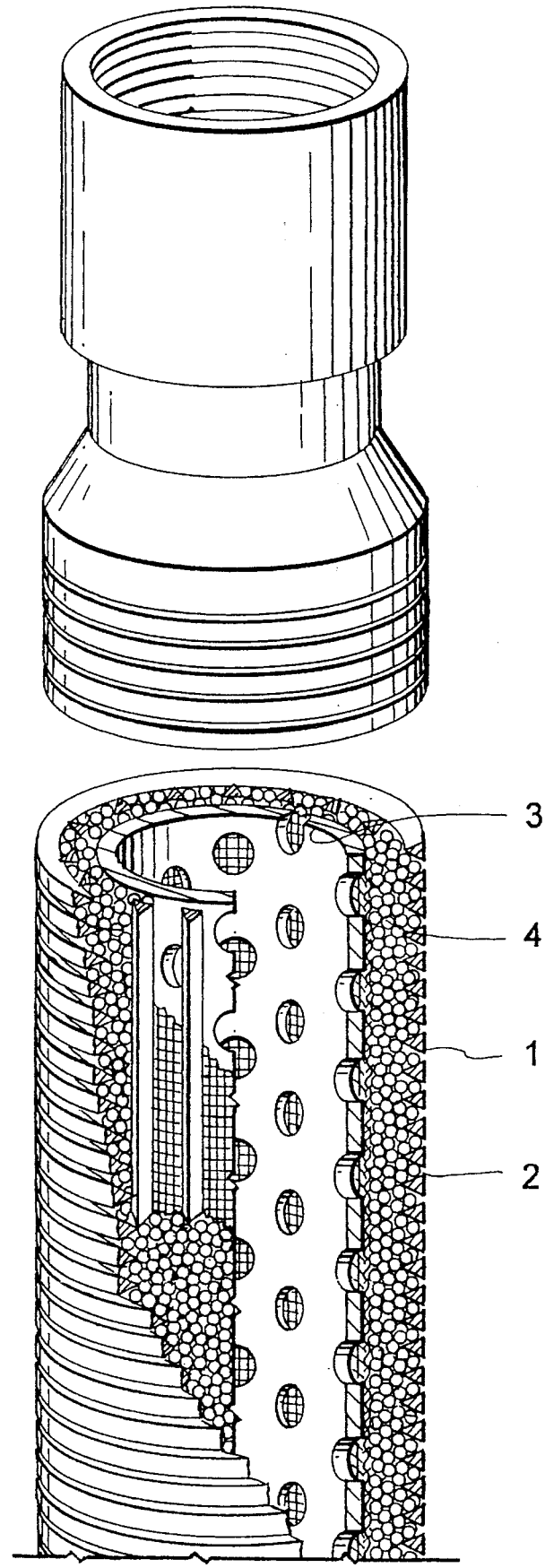
FIG. 1 is a drawing of a common prepacked well screen having a wire screen on the outside.

FIG. 1 shows a typical prepacked screen. The screen is constructed of wire, 1, with slots, 2, of a constant width. On the inside is another screen which is lined, 3, and the liner is perforated. In between the outer and inner screens is an annular space containing the granular material, 4, which comprises the gravel pack of the prepacked well screen.

In some prepacked screens the inside screen is replaced with a type of lightweight screen, somewhat resembling window screen or even a very light mesh screen. Some companies have even used a layer of plastic or similar material inside which serves to hold the gravel pack in place until the coating on the gravel hardens, and the plastic is then removed.

Figure 2:
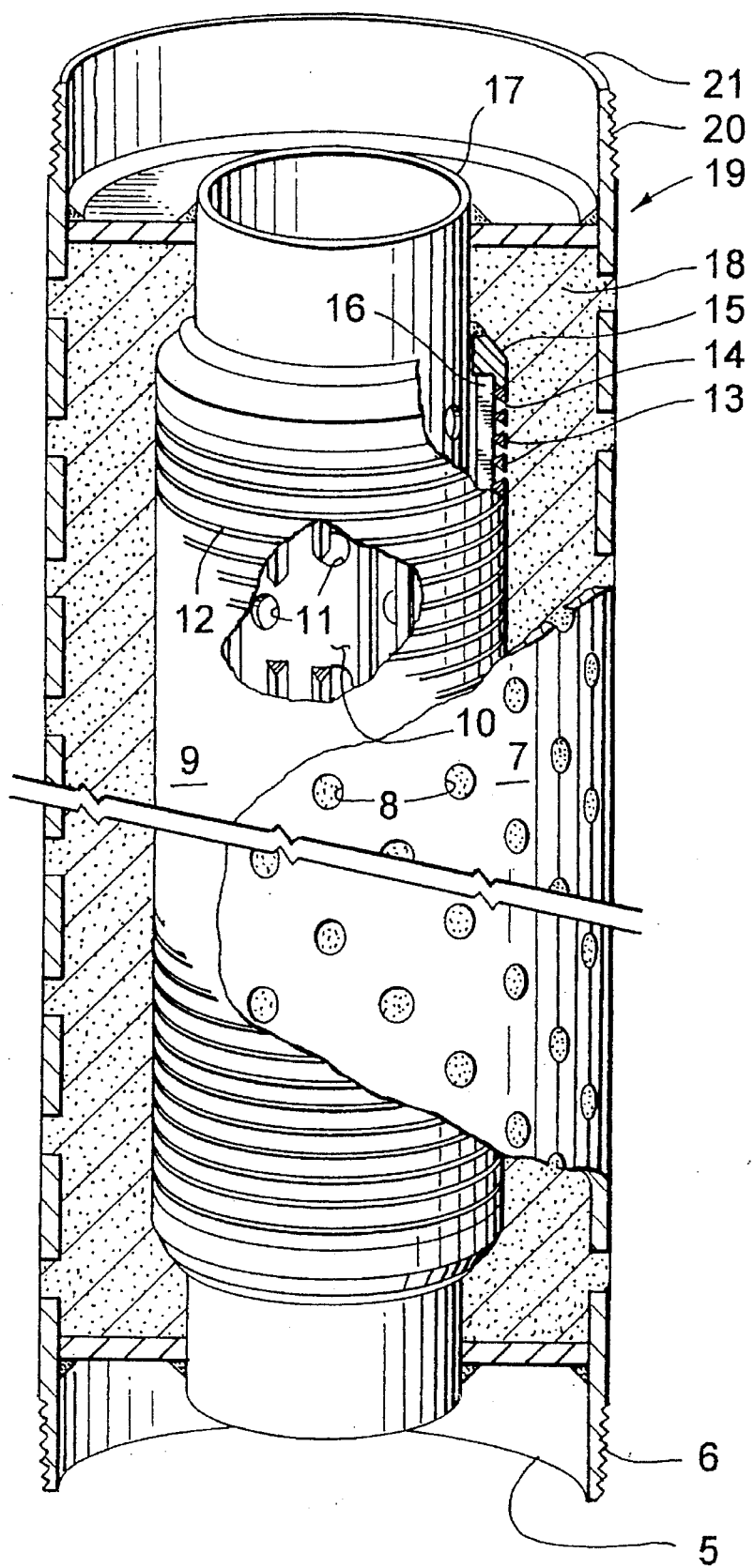
FIG. 2 is a drawing of another type of prepacked well screen, having a wire screen on the inside and a slotted liner on the outside. The drawings are exemplary only and should not be construed as limiting the invention.

Another type of prepacked well screen is described in the FIG. 2. It comprises a length of well tubing or casing, 7, which might typically be a length of 30 feet. The ends of the casing are preferably provided with threads, 6, which permit the particular length of casing to be joined to other lengths in the usual fashion. Before the casing, 7, is assembled into the assembly, 19, it is perforated in the intermediate region defined between the upper and lower annular plate members, 21 and 5.

The screen jacket, 9, is preferably formed of wire, 13, which is helically wound and welded to screen support rods, 10, so as to form a continuous slot, 14, of constant width, typically ranging from 0.006 to 0.40 inches. The screen jacket, 9, has end portions such as rings, 15, which may be welded to a pipe-base support member, 17. The pipe member, 17, is perforated at, 11, inside the screen jacket 9 but is unperforated at its ends. The space containing gravel pack is 18.

Suitable particulate material for use in packing the casing of the screen includes particulate solid material which is stable at the conditions that will be encountered in the producing formations over a long period of time. For our purposes, it is only necessary that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production. As a practical matter, naturally occurring particulate material such as sand and gravel are often used.

The size of the particles would be selected in relation to the width of the slots in the screen jacket and the size of the particles in the formation in accordance with the usual practice in the industry.

Our invention comprises coating the sand or gravel of the prepacked well screen with the resin system described herein which allows the use of prepacked screens under conditions which are currently prohibited. This resin system maintains integrity when exposed to higher temperatures and stronger acids than are the limits of resin systems currently available in the art.

The consolidated gravel in the prepacked screen is coated with furan resin, an ester acetate, e.g. butyl acetate, and an acid catalyst, either at the surface or downhole. Alternatively, a liquidized wet gravel may be placed into the screen during manufacture and cured after placement. Other options would include placing the screen with uncoated gravel in the well and then coating with resin downhole.

The resin system preferably comprises from 60.0 to 90.0 percent by weight resin in its commercial form, 15 to 30 percent by weight ester, such as butyl acetate, and from 0.01 to 5.0 percent by weight of any acid catalyst, e.g., o-nitrobenzoic acid or toluene sulfonic acid. A preferred method of formulating this solution is to mix the acid with the ester and then mix four parts of the resin emulsion with one part of the mixture of ester and acid.

Any acid known in the art can be used as the catalyst. The preferred internal acid catalyst used to catalyze polymerization of the resin is an oil soluble, very slightly water soluble organic acid. The most preferred acids are o-nitrobenzoic acid or toluene sulfonic acid. From 0.05 to 5.0 and preferably from 1.0 to 4.0 percent by weight of the slightly water soluble organic acid catalyst is incorporated in the resin solution used to coat the particles.

The resin solution and the sand or gravel are mixed together. It is preferred that the volume ratio of sand or gravel to resin solution is from 10 to 30, and preferably 15.0 to 25.0. The sand or gravel and resin emulsion are mixed until the particles are thoroughly coated. The appearance and texture of the material produced by the above procedure is a wet, tacky mass of coated particles.

In a preferred mode, a solution is prepared that contains about 80 percent resin and about 19 percent butyl acetate and from 0.8 to 1.2 percent acid catalyst such as o-nitrobenzoic acid or toluene sulfonic acid.

The solution is used to coat the consolidated gravel in the prepacked screen at the surface. The entire assembly is then cured such as by heating, for example, until the resin-coated particles are fused together in a unitary consolidated mass. The curing is controlled by the acid strength and concentration and by temperature.

The oil soluble internal catalyst can be safely mixed with the resin, and the fluid containing both catalyst and resin injected into the annular space of the prepacked screen assembly. The catalyst activity is highly dependent on temperature, and at temperatures as low as 60° F., with catalyst incorporated in the resin-containing fluid, polymerization of the resin will occur in a reasonable period of time. For example, a mixture of 0.5 to 3 and preferably about 1% toluene sulfonic acid and 1 to 50%, preferably about 20% of a polar organic diluent are prepared. To this mixture of butyl acetate and toluene sulfonic acid is added from 50 to 90, preferably about 79% resin, e.g. the furfuryl alcohol oligomer. This homogeneous organic fluid can then be injected via an injection string into the well without danger of premature polymerization.

Alternatively, a liquidized wet gravel can be placed into the screen during manufacture. In this case, the catalyst and ester can be applied in a method similar to that described above.

Any acid-catalyzed, polymerizable, resinous material which can be used to coat the particles, and then be suspended in the carrier fluid for placement in the formation cavity can be used in our invention. A particularly preferred resin is the furfuryl alcohol oligomer $(C_4H_3OCH_2)_xH$, which is a relatively inexpensive polymerizable resin which autopolymerizes upon exposure to acid catalyst, forming a thermosetting resin, which cures to an insoluble mass highly resistant to chemical attack and thermal degradation. Specifically it is recommended that the resin used be "QUACOR 1300 FURAN RESIN"® marketed by Q. O. Chemical or the essential identical EX18663 made by Acme Resin Corp. This particular resin is favored because it is oil soluble.

The furfuryl alcohol oligomer may be desirably diluted with an appropriate solvent such as butyl acetate to decrease viscosity of the fluid such that it can be manageably used to coat the solid particles.

As the furfuryl alcohol oligomer comes into contact with the acidic catalyst, the action of the heat in the formation and catalyst drives the auto-polymerization reaction forward. Thus, the alcohol oligomer polymerizes to a solid mass.

As the polymerization reaction proceeds, water is produced as a by-product. If this water production is allowed to go unchecked, the polymerization reaction will soon equilibrate:

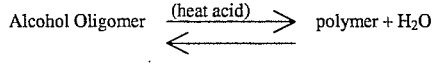

By providing an ester of a weak organic acid in the reaction mixture, the by-product water is consumed in a hydrolysis reaction of the ester to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction:

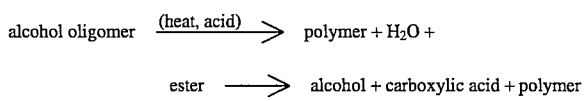

$$\text{ester} \longrightarrow \text{alcohol} + \text{carboxylic acid} + \text{polymer}$$

The amount of resin coated on the sand or gravel particles as a percent of the weight of particulate and resin is from 2 to 10 percent and the catalyst content as a percent of resin is from 1.0 to 5.0 percent. These concentrations can of course be varied depending on individual characteristics of the selected resin and catalyst as well as conditions encountered in the particular application.

To further illustrate the invention, Applicants present the following experiment and example to illustrate the process described above, although this is supplied for the purpose of complete disclosure and is not intended to limit the scope of our invention in any way.

EXPERIMENTAL

For the purpose of demonstrating the improved resin coating of the particulate material of our prepacked well screen, resin-coated sand was prepared under laboratory conditions. The following procedure was used to prepare the resin coated sand.

A resin mixture was prepared by saturating butyl acetate ester with o-nitrobenzoic acid. This required about 99 parts of butyl acetate ester to one part o-nitrobenzoic acid. This mixture was added to the resin EX18663 (Acme Resin Corp) with the volume ratio of ester mix to resin being 20/80.

The mixture of resin, ester and nitrobenzoic acid was mixed with relatively clean sand and was loaded into an annular space defined by a casing, well screen and first annular ring, in the ratio of 10 parts of resin mix to 90 parts sand. The amount of resin used on sand particles was just sufficient to bond adjacent particles without significantly reducing porosity. The entire assembly was then cured by heating.

EXAMPLE

A prepacked well screen was assembled using the resin-coated gravel described herein which demonstrates significant advantages, especially with respect to inertness and thermal stability. In the assembly of a well screen, after the casing portion has been perforated and the screen jacket has been attached to its generally cylindrical support base, a first annular ring of easily drillable steel is welded to one unperforated end portion of the support base. The well screen with said ring attached is then loaded inside the unperforated end portion of the casing member and the ring is welded to the inner wall of the casing so as to centralize the screen within the casing. The casing-well screen assembly is then positioned vertically and its outer perforated surface is covered by a covering of a fabric, a metal fine mesh cloth, or a sleeve, for example. The covering can be any suitable material which will block off the outer ends of the perforations. Then, loose resin-coated sand or gravel or other porous material is loaded into and consolidated in the perforations and in the annular space defined by the casing, well screen and first annular ring. A second annular ring of easily drillable steel can then be placed on top of the porous material and welded to the upper unperforated portions of the casing and well screen support base.

A solution is prepared that contains about 80% resin, 19% butyl acetate, and from 0.8 to 1.2% acid catalyst such as toluene sulfonic acid. The solution is used to coat that consolidated gravel in the prepacked screen at the surface.

The entire assembly including the covering is then cured by heating at 200° F. until the resin-coated particles are fused together in a unitary mass. At this stage, the casing covering can be removed since the particles would no longer be able to fall out of the perforations. The amount of resin coating on sand particles should be just sufficient to bond adjacent particles without significantly reducing the porosity of the consolidated mass.

Although our invention has been described in terms of specific preferred embodiments and examples which Applicants believe to include the best mode for applying their invention known to Applicants at this time, it will be recognized to those skilled in the art that various changes may be made in the composition and methods described herein without departing from the true spirit and scope of our invention which is defined more precisely in the claims appended hereinafter below:

We claim:

1. In any version of a prepacked well screen assembly well known in the industry, comprising a wire screen and perforated casing with an annular space between filled with granular material, the improvement wherein said granular material is coated with a resin composition comprising an oligomer of furfuryl alcohol, an acid catalyst and an ester of a weak organic acid.

2. A prepacked well screen as in claim 1 wherein the resin composition is added to the granular material in the annular space after the prepacked screen is in place in a well.

3. A prepacked screen as in claim 2, wherein the resin composition is in a carrier fluid which also contains an inorganic salt.

4. A prepacked screen as in claim 3 wherein the inorganic salt is sodium chloride and it is present in an amount to saturate the carrier fluid.

5. A prepacked screen as in claim 1 wherein the ester of a weak organic acid is an ester acetate.

6. A prepacked well screen as in claim 5 wherein the ester acetate is selected from ethyl acetate, methyl acetate, propyl acetate and butyl acetate.

7. A prepacked well screen as in claim 6 wherein the ester is butyl acetate.

8. A prepacked well screen as in claim 1 wherein the concentration of ester in the resin composition is from 20 to 50 percent by weight.

9. A prepacked screen as in claim 1 wherein the acid in the resin composition is selected from all acids.

10. A prepacked screen as in claim 1 wherein the acid in the resin composition is selected from all organic acids.

11. A prepacked well screen as in claim 10 wherein the organic acid is selected from o-nitrobenzoic acid, toluene sulfonic acid, oxalic acid and benzoic acid.

12. A prepacked well screen as in claim 11 wherein the organic acid in the resin composition is toluene sulfonic acid.

13. A prepacked well screen as in claim 1 wherein the concentration of organic acid in the resin composition is from 0.5 to 5.0 percent by weight.

14. A prepacked well screen as in claim 1 wherein the granular material in the well screen is treated with the resin composition, prior to delivery to the well site.

15. A prepacked screen as in claim 1 wherein the particulates in the granular material are coated with the resin solution in the volume ratio of from 99 to 80 parts particulate to one to 20 parts resin solution.

16. A prepacked screen as in claim 1 wherein the granular material in the filter medium is selected from the group consisting of sand, glass beads, nut shells, metallic pellets or spheres, gravel, synthetic resin pellets or spheres, gilsonite, coke, sintered alumina, sintered bauxite, other ceramics, and mullite and combinations thereof.

17. A prepacked screen as in claim 16 wherein the granular material in the filter medium is selected from the group consisting of sand or gravel.

18. A method for improving resistance to strong chemicals and increasing the thermal stability of granular material in a prepacked screen which comprises:

coating the granular material with a resin system consisting essentially of an oligomer of furfuryl alcohol, a catalyst comprising an oil soluble, slightly water soluble organic acid, and an ester of a weak organic acid.

* * * * *